Dec. 7, 1954   R. I. MARKEY ET AL   2,696,104
LANDING GEAR TESTING APPARATUS
Filed May 26, 1951   5 Sheets-Sheet 3

INVENTORS.
ROSCOE I. MARKEY
MERLE J. FRANK
HENRY J. SIERADZKI
BY
ATTORNEYS

Dec. 7, 1954 R. I. MARKEY ET AL 2,696,104
LANDING GEAR TESTING APPARATUS
Filed May 26, 1951 5 Sheets-Sheet 4
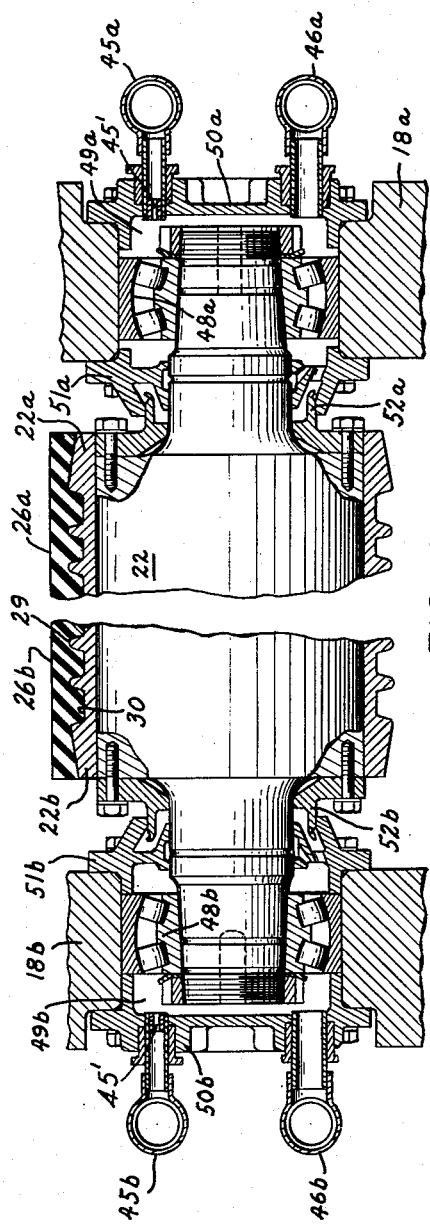
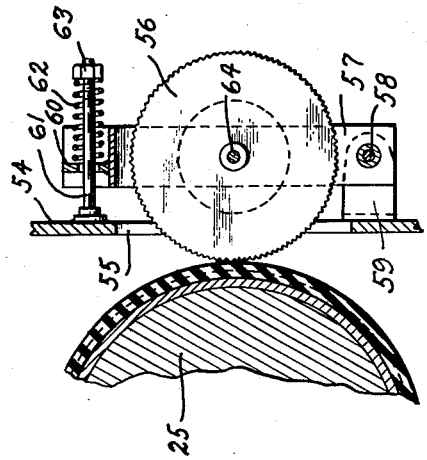
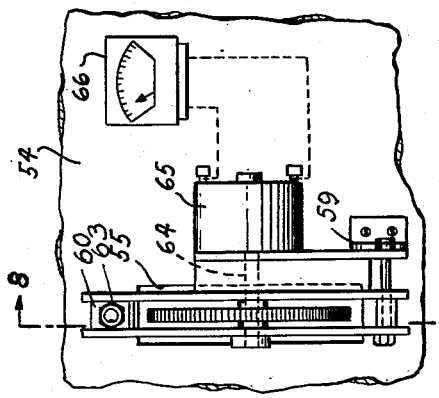
INVENTORS.
ROSCOE I. MARKEY
MERLE J. FRANK
HENRY J. SIERADZKI
BY
ATTORNEYS

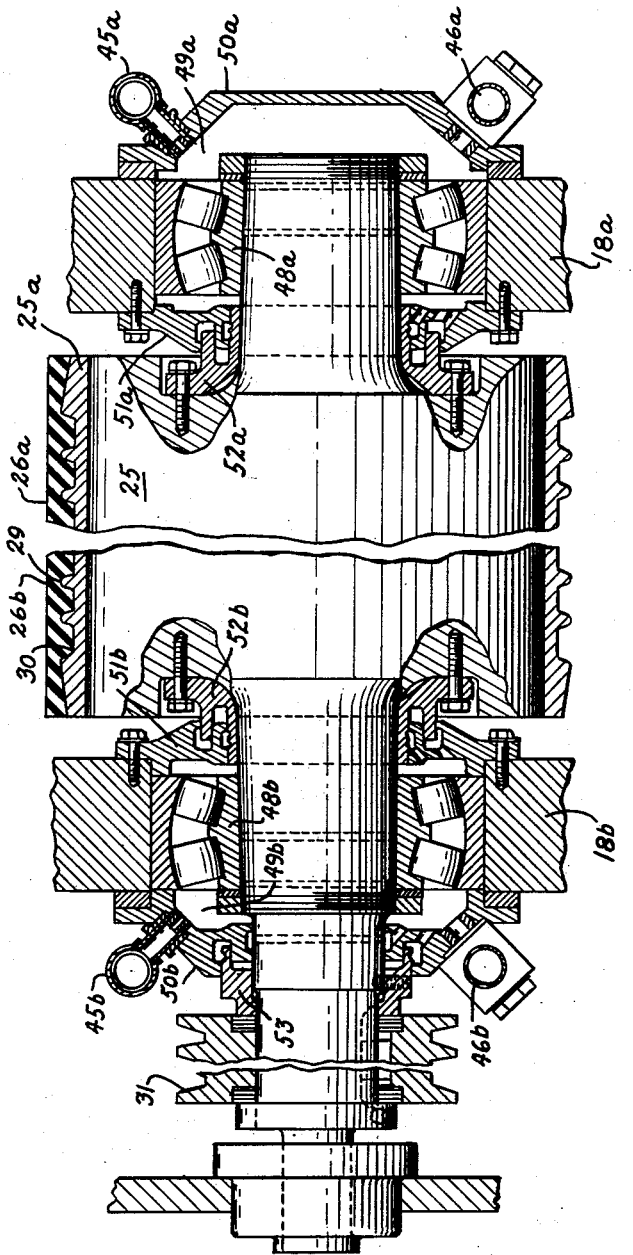

United States Patent Office 2,696,104
Patented Dec. 7, 1954

2,696,104

LANDING GEAR TESTING APPARATUS

Roscoe I. Markey, Buffalo, N. Y., and Merle J. Frank, Pikesville, and Henry J. Sieradzki, Hagerstown, Md., assignors to Fairchild Engine and Airplane Corporation, Hagerstown, Md., a corporation of Maryland Application May 26, 1951, Serial No. 228,464

6 Claims. (Cl. 73—11)

This invention relates to landing gear testing apparatus, and has particular reference to apparatus for testing aircraft landing gear under conditions accurately simulating the rigorous usage to which the gear is subjected in actual practice.

Heretofore, a common method of testing aircraft landing gear has been to drop the aircraft from a given height onto a horizontal or inclined stationary surface so as to land on the entire gear, one wheel, three point, or the like, in the effort to simulate actual landing load effects. Alternatively, only the gear itself is dropped with weight added thereto substantially equal to the weight of the aircraft. Whereas these procedures are satisfactory in some instances, for testing slow speed and lightweight aircraft, they are not adequate for testing the landing gear of large or high speed landing aircraft, because other components of load resulting from contact of the gear with the ground also enter the problem in such cases, with the result that the usual tests are inconclusive and unreliable. Some effort has been made to overcome this inadequacy by spinning the landing wheels up to a peripheral rate substantially equivalent to the landing speed of the aircraft prior to dropping the gear on the test surface, but that expedient sets up an action which is the reverse of that which actually takes place, since the wheels normally are stationary, with the result that the engagement of the spinning tire with the test surface scuffs sufficient rubber from the tire to afford some lubrication, thus causing false and unreliable effects.

In accordance with the present invention, aircraft landing gear testing apparatus is provided which accurately simulates all of the landing conditions of both light and heavy weight aircraft as well as high and low speed aircraft, so that reliable tests equal to those determined in actual practice may be obtained and the landing gear corrected if necessary before endangering the lives of passengers and crew and damaging costly and perhaps strategic aircraft in the first actual field test.

In a preferred embodiment of the invention, the landing gear apparatus consists of a group of rollers mounted in a suitable frame jointly encircled by an endless belt driven at any desired speed up to 160 miles per hour so as to simulate the landing speed of the aircraft and the actual contact of the gear with the ground when the gear is dropped onto the moving belt at the landing speed of the aircraft.

Means are provided for adjusting the overall width and tightness of the belt, the speed of movement thereof, measurement of its linear surface speed, and for simply changing the belt without dismantling the entire apparatus.

It will be seen that the landing gear testing apparatus of this invention affords a very simple but reliable means for testing all sorts of landing gear under conditions accurately simulating actual field operations whereby landing shock on and drag of the gear, its strength and mobility may be predetermined before it is mounted on the airplane. The apparatus also enables undercarriage tests not heretofore possible except at great cost and risk such as wheel shimmy tests at speeds of 100 miles per hours, simulated cross-wind landing conditions, simulated variations in terrain, and the like. Thus, defects in the gear may be corrected and the gear may be adjusted or modified where necessary before mounting on actual aircraft to preclude conditions that might otherwise be found to be dangerous.

For a more complete understanding of the invention, reference may be had to the accompanying drawings, in which:

Figure 1 is a perspective view of the landing gear testing apparatus of this invention with the driving power unit omitted to expose the operating mechanism of the apparatus;

Figs. 2A and 2B jointly illustrate a plan view of the apparatus with the exception of the power plant, Fig. 2A showing the belts constituting the testing runway spaced apart, and Fig. 2B showing the belts arranged side by side in closely spaced relation;

Fig. 5 is an enlarged fragmentary axial section through one of the intermediate rollers as seen along the line 5—5 of Fig. 3;

Fig. 6 is an enlarged fragmentary axial section through the driving roller and drive pulley attached thereto as seen along the line 6—6 of Fig. 3;

Fig. 7 is a fragmentary end view of the runway speed measuring and indicating mechanism as seen along the line 7—7 of Fig. 2B; and Fig. 8 is a section therethrough as seen along the line 8—8 of Fig. 7.

Figure 1:
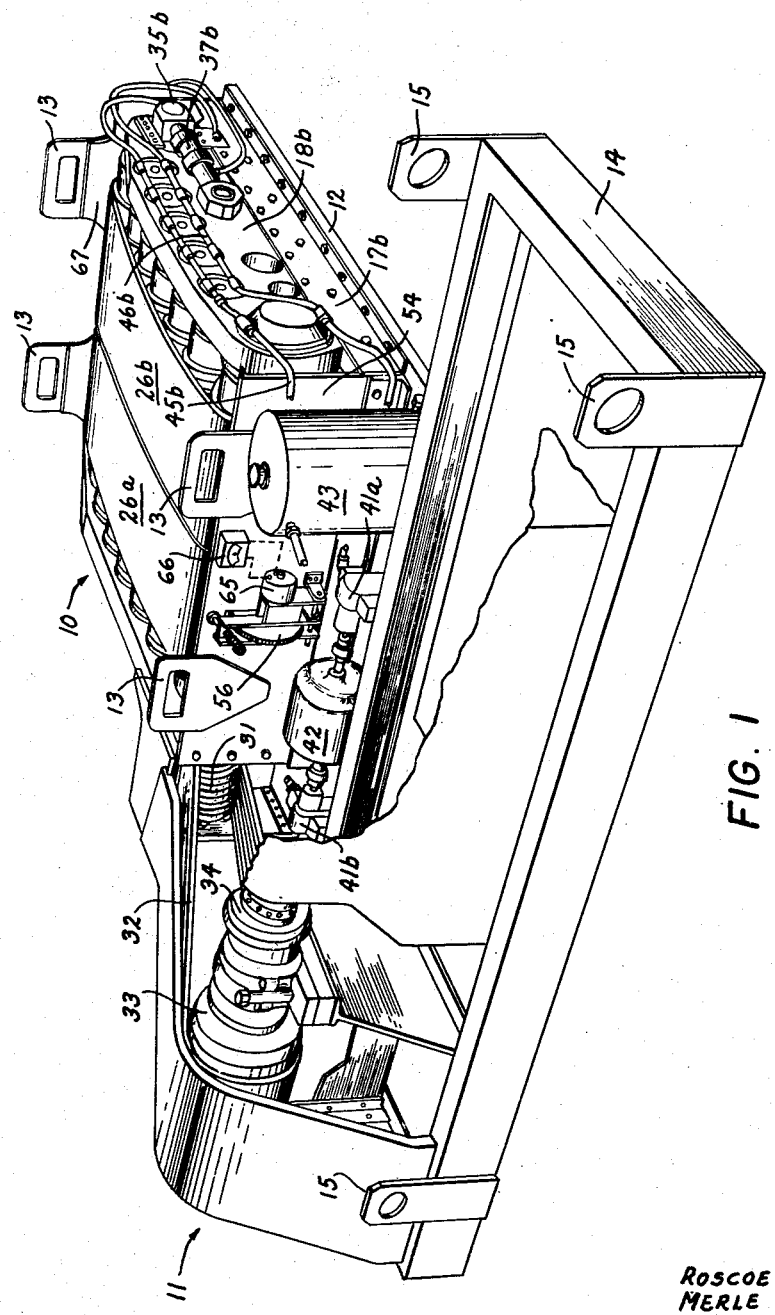

Referring to the drawings, numeral 10 generally designates the landing gear testing apparatus, and numeral 11, the driving mechanism therefor, the former being mounted on a portable base plate 12 provided with eyes 13 at each end whereby it may be hoisted and transferred from one point to another. The base plate 12 is separably bolted to bed plate 14 of the driving mechanism 11, also provided with hoisting eyes 15 whereby it may be transferred from one point to another after being unbolted from the base plate 12 by disconnecting bolts 16 shown in Figs. 2B and 3.

Bolted to the base plate 12 by means of side plates 17a and 17b are the opposite bearing plates 18a and 18b in which are journalled a plurality of rollers 19, 20, 21, 22, 23, 24 and 25. As shown particularly in Figs. 4, 5 and 6, the rollers 19 to 25 are solid and preferably are made of steel, not only for maximum strength to withstand the landing shock, but also to obtain the maximum flywheel effect by reason of their rotation. The remainder of the apparatus preferably is constructed as lightly as strength requirements permit, since the apparatus is portable in the sense that it may be removed from one place to another for testing landing gear fitted on aircraft, and also in the shop for separate landing gear tests.

Figure 4:
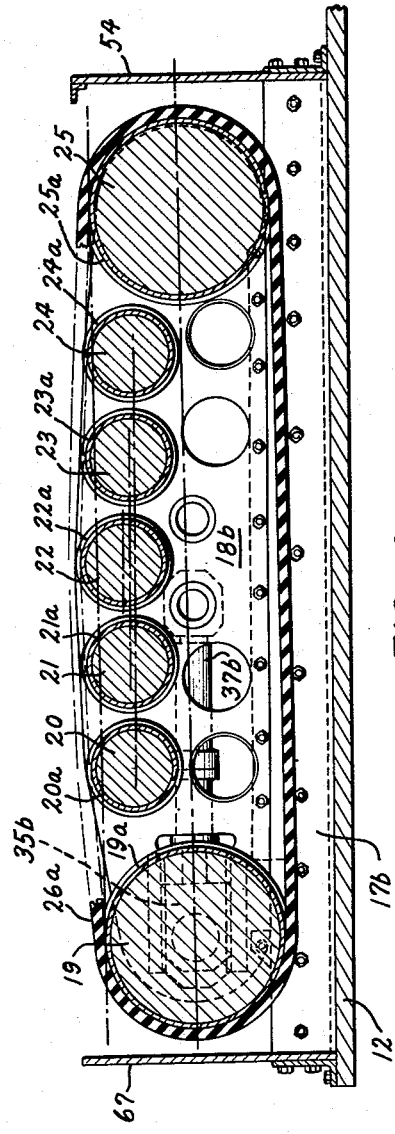
Fig. 4 is a vertical section therethrough as seen along the line 4—4 of Figs. 2A and 2B.

As shown by their horizontal center lines in Fig. 4, the relatively small diameter intermediate rollers 20 to 24, inclusive, not only extend above the tangent plane between the large end rollers 19 and 25, but the centers of intermediate rollers 21 and 23 lie above the centers of rollers 20 and 24, whereas the center of middle roller 22 lies above the centers of the remaining intermediate rollers 20, 21, 23 and 24 and thus a generally convex contour is imparted to the belts. The effect of this varying vertical positioning of the intermediate rollers 20 to 24, inclusive, is to increase the area of contact of these rollers with the belts 26a and 26b, so that the latter drive the intermediate rollers without slippage and the combined momentum of the heavy rollers imparts to the belts sufficient driving power to produce the force that simulates the landing gear springback that takes place in usage.

Figure 2:
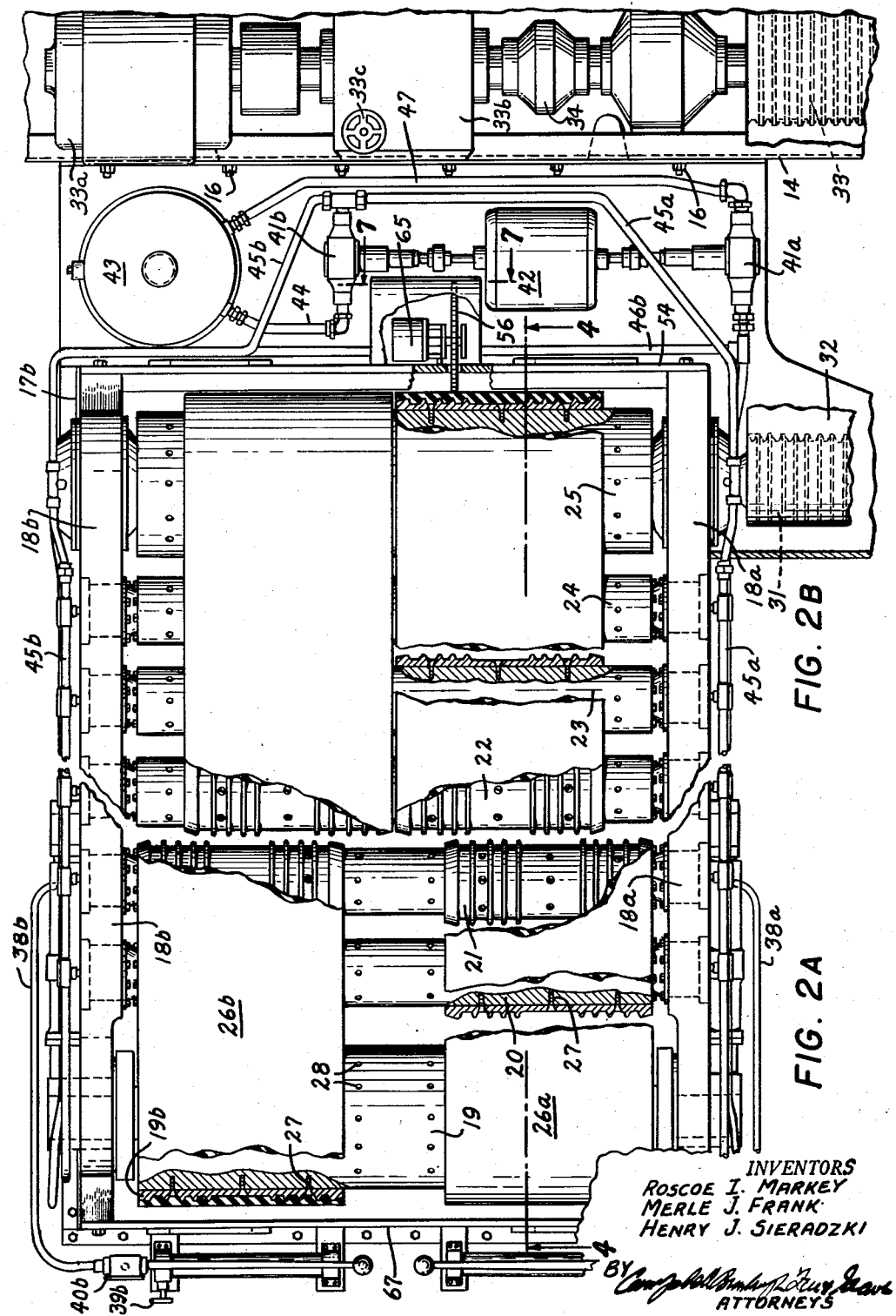
Figure 3:
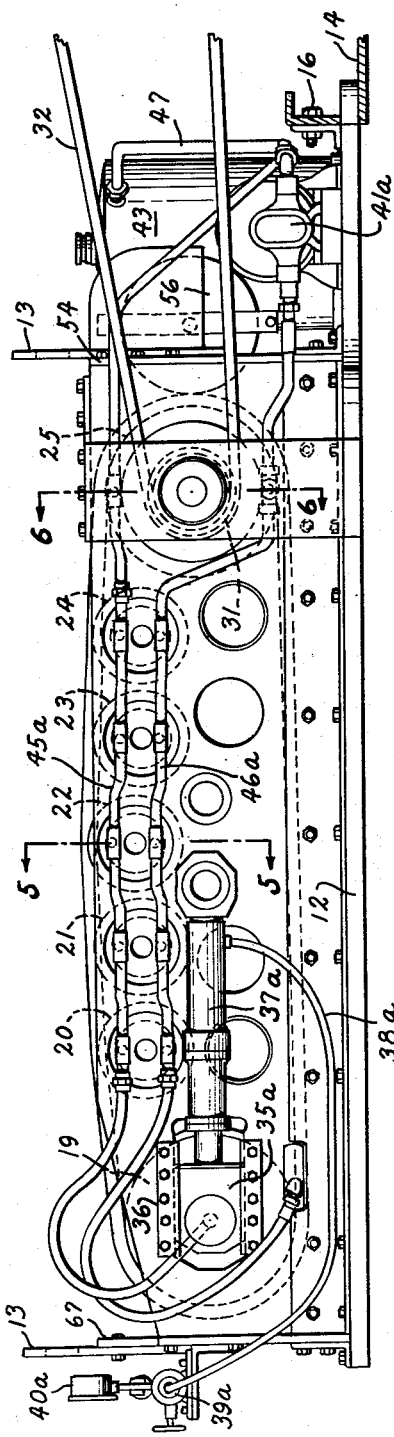
Fig. 3 is a side elevation of the apparatus.

The belt 26a passes over tubular sleeves 19a, 20a, 21a, 22a, 23a, 24a and 25a which are telescoped over the near ends of the rollers 19 to 25, inclusive, as seen in Figs. 2A, 2B and 4. As is shown particularly in Figs. 2A and 2B, the sleeves 19a to 25a are held in place by countersunk tap screws 27 passing through the corresponding sleeves and screwed into tapped holes 28 in the corresponding rollers. Tapped holes 28 are accurately spaced axially along the corresponding rollers and lie in common vertical planes for the several rollers, so that the corresponding sleeves may be adjusted along the rollers and fixed in the same axial position by the tap screws 27.

The other ends of the rollers 19 to 25 are equipped with sleeves 19b to 25b, shown at the upper portion of Figs. 2A and 2B and adjustable axially of the corresponding rollers 19 to 25 by removing the tap screws 27, sliding the corresponding sleeves axially of the roller and resetting the tap screws 27 in the next axial series of tapped holes 28. In Fig. 2A, the sleeves are shown positioned at the outer ends of the corresponding rollers 19, 20 and 21, so that the belts 26a and 26b are spaced apart, whereas in Fig. 2B, the sleeves are shown positioned inboard from the outer ends of the corresponding rollers 22 to 25, inclusive, so that the belts 26a and 26b lie side by side.

As shown especially in Figs. 2A, 2B, 5 and 6, the sleeves 19a to 25a and 19b to 25b are provided with alternate circumferential surface ridges 29 and grooves 30, respectively. The corresponding belts 26a and 26b are provided on their inner surfaces with complementary ribs fitting in the roller grooves 30 and intermediate slots fitting over the roller ridges 29, so that the belts 26a and 26b are not movable laterally on the corresponding rollers, and the frictional surface areas of the belts and rollers are increased. The belts 26a and 26b are preferably a composite of rubber and fabric with interior and exterior surfaces coated with rubber to afford the desired degree of friction not only between the rollers and the belts, but also between the outer surfaces of the belts and the landing gear in simulation of the terrain on which the landing gear is intended to land.

Belts 26a and 26b are driven frictionally by driving roller 25 and the belts 26a and 26b in turn frictionally drive the rollers 19 to 24, inclusive. Drive roller 25 has an axial extension on which is mounted driving sheave 31 which is connected by drive belt 32 to the pulley 33 of the power plant mounted on bed plate 14. The power plant may be either a heavy duty direct current electric motor 33a capable of being controlled by a rheostat to drive the belts 26a and 26b at a surface speed equivalent to 50 to 160 miles per hour, or an internal combustion engine capable of being controlled to drive the belts 26a and 26b at the indicated speed range, or a constant speed power plant with infinitely variable speed gearing 33b adjustable by means of handwheel 33c to drive the belts 26a and 26b at the indicated speed range, or equivalent variable speed driving mechanism. A conventional slip clutch 34 is interposed between the power plant and the pulley 33 to preclude injury to the power plant in case of a sudden overload on the belts 26a and 26b.

The bearings of all of the rollers 20 to 25, inclusive, are fixedly mounted in the bearing plates 18a and 18b, but the end roller 19 is adjustable laterally to vary the tension on the belts 26a and 26b in accordance with operating requirements. To attain this end, the bearings of roller 19 are mounted in bearing blocks 35a and 35b, horizontally slidable in guides 36 in the opposite bearing plates 18a and 18b by corresponding hydraulic rams 37a and 37b mounted on the bearing plates 18a and 18b on each side of the apparatus. Hydraulic fluid from a suitable source of supply under pressure is independently supplied to the rams 37a and 37b by tubes 38a and 38b, the supply being controlled by corresponding valves 39a and 39b and the pressure on each bearing block being indicated by corresponding pressure gauges 40a and 40b as shown particularly in Figs. 2A and 3. By manipulating valves 39a and 39b, pressure fluid is applied to the rams 37a and 37b or relieved therefrom to cause corresponding bearing blocks 35a and 35b to be adjusted inwardly or outwardly to thereby loosen and tighten the tension of belts 26a and 26b. By making each bearing block 35a and 35b separately adjustable, variations in belt tightness may be compensated.

Because of the high operating speeds involved, a pressure-vacuum lubricating system is provided to preclude bearing failure under the high loads imposed. The lubricating system comprises a pair of gear type oil pumps 41a and 41b, driven by electric motor 42. Pump 41b supplies oil under pressure from tank 43 by line 44 to lines 45a and 45b which distribute the lubricant to the bearings of the rollers 19 to 25, line 45a extending along one side of the machine, and line 45b extending along the opposite side of the machine, as shown particularly in Figs. 1, 2A, 2B, 5 and 6. Pump 41a serves as a vacuum pump and removes the oil from the bearings of rollers 19 to 25, inclusive, by vacuum lines 46a and 46b, one line extending along one side of the machine, and the other line extending along the other side of the machine as is shown particularly in Figs. 1, 3, 5 and 6. The returned oil is supplied by vacuum pump 41a to reservoir 43 by line 47, shown particularly in Figs. 2B and 3. In this way, continuous lubrication under pressure is supplied to the bearings of rollers 19 to 25 under all operating loads and speeds.

The cavities 49a and 49b of the bearings of the rollers 19 to 25 are best shown in Figs. 5 and 6, wherein the two-part roller bearings 48a and 48b are shown seated in the corresponding bearing plates 18a and 18b. The bearing cavities 49a and 49b are sealed on the outside by plates 50a and 50b bolted to outer surfaces of the bearing plates 18a and 18b and through which the lubricant supply pipes 45a and 45b and the lubricant return pipes 46a and 46b are sealed, as is shown particularly in Figs. 5 and 6. The lubricant flow from supply pipes 45a and 45b is metered through orifice nipples 45' to insure uniform lubrication for all bearings.

The inner sides of the bearing cavities 49a and 49b are sealed by plates 51a and 51b bolted to the inner surfaces of the bearing plates 18a and 18b. These plates have openings for the passage of the spindles of the corresponding rollers 20 to 25, and these openings are sealed liquid tightly by tubular flanges 52a and 52b bolted to the ends of the corresponding rollers and closely fitting within the corresponding cover plates 51a and 51b without friction. It will be understood that the lubricant seal between flanges 52a, 52b and plates 51a, 51b, affords the necessary relative rotation without lubricant leakage. A similar seal is afforded between outer cover plate 50b and a tubular flange 53 secured to the spindle of roller 25 carrying the drive sheave 31, as shown particularly in Fig. 6. The combination of members 50a, 50b, 51a, 51b and 53 constitutes a labyrinth seal.

Means are provided for accurately measuring and indicating the linear surface speed of the belts 26a and 26b and this measuring and indicating means is shown in enlarged detail in Figs. 7 and 8. The end plate 54 bolted to the base plate 12 is provided with a slot 55 through which projects a friction disc 56 whose shaft is journalled in a frame 57 pivoted about horizontal pin 58 in a bracket 59 secured to end plate 54. The upper end of the pivoted frame 57 is provided with a crossplate 60 having an opening through which extends a rod 61 fixed on end plate 54 and encircled by a coil spring 62, whose tension is adjusted by a thumb nut 63 threaded on rod 61. It will be observed that by reason of this arrangement, friction disc 56 is spring-pressed against the belt 26a. The rim of the friction disc 56 is roughened as by knurling, and its pressure against the surface of the belt 26a may be adjusted by means of thumb nut 63.

The shaft 64 of friction disc 56 is directly connected to the armature of a direct current generator 65 which generates a voltage whose magnitude is directly proportional to the speed of rotation of its armature. Since the speed of the generator armature bears a fixed relation to the speed of the belt 26a, the scale of a voltmeter 66 indicating that voltage is calibrated to directly indicate the speed in miles per hour at which the surface of belts 26a and 26b is being driven. Voltmeter 66 may be mounted on any convenient point on the apparatus for indicating simulated landing speed of the landing gear in miles per hour.

Means are provided for removing and replacing the belts 26a and 26b at the near side of Fig. 1, where the bearing plate 18b stops short of the end plates 54 and 67, so that clearance for the belt is thus provided. The valves 39a and 39b are first opened to relieve the pressure on bearing blocks 35a and 35b so that the rams 36a and 36b retract them and end roller 19 so that the belts 26a and 26b become loose. Then the lubricant pressure and vacuum lines 45b and 46b are disconnected as well as the corresponding hydraulic ram 37b and its line 38b. The side rail 17b is then unbolted from the base plate 12, whereupon the belts 26b and 26a are free for removal in that order, and replacement in the reverse order. It will be observed that removal of the belts 26a and 26b can be effected from only one side of the machine, that is, the near side of the apparatus as shown in Fig. 1, since the opposite bearing plate 18a is connected to the end plates 54 and 67 and does not afford the necessary clearance.

In operation of the landing gear apparatus of this invention, the belts 26a and 26b are simultaneously driven through driving roller 25 at the desired surface speed by adjustment of handwheel 33c to vary the speed by which the motor 33a drives the pulley 33. By reason of the position and arrangement of the intermediate rollers 20 to 24, these rollers as well as opposite end rollers 19 are driven frictionally by the belts 26a and 26b to the desired speed in simulation of the landing speed as indicated on the voltmeter 66. By tightening or loosening the belts 26a and 26b by manipulating valves 39a and 39b to adjust the corresponding bearing blocks 35a and 35b of end roller 19, the degree of tension of the belts 26a and 26b may be adjusted to maintain the proper driving connection between the rollers and the belts.

The ruggedness of the runway afforded by the rotating belts enables spin up and dynamic springback loads on the landing gears to be tested, and by adjusting the angle of the axis of the landing gear wheels or tracks relatively to the direction of rotation of the belts 26a and 26b, cross-wind landing conditions may be accurately simulated. Nose gear shimmy may be similarly predetermined by placing the landing nose gear at the predetermined angle on the runway afforded by belts 26a and 26b.

By spreading the belts 26a and 26b apart through the axial adjustment of the sleeves 19a to 25a, and 19b to 25b, along the corresponding rollers 19 to 25 in the manner described, testing of dual wheel or track gear as well as single wheel or track gear may be effected in simulation of all operating conditions. The rugged construction with the solid rollers 19 and 25 enables testing landing gear at a maximum dynamic vertical load of approximately 88 tons.

Although a preferred embodiment of the invention has been illustrated and described herein, it is to be understood that the invention is not limited thereby, but is susceptible of change in form and detail within the scope of the appended claims.

We claim:

1. In aircraft landing gear testing apparatus, the combination of a frame, spaced journals on said frame, parallel end rollers in said journals, power means for driving one of said rollers, alternate circumferential ridges and grooves on said rollers, an endless belt encircling said rollers and driven thereby to constitute a driven runway for the gear, complementary alternate ridges and grooves on the inner surface of said belt matching those on said rollers, said rollers being essentially solid and formed of heavy metal to act as flywheels intermediate supporting rollers journalled on said frame and extending above a plane tangent to the end rollers for supporting and deflecting the upper course of said belt in a substantially convex contour, and alternate circumferential ridges and grooves on said intermediate rollers corresponding to those on said end rollers and engaging the complementary ridges and grooves on the inner surface of said belt.

2. In aircraft landing gear testing apparatus, the combination of a frame, spaced journals on said frame, parallel end rollers in said journals, power means for driving one of said rollers, an endless belt encircling said rollers and driven thereby to constitute a driven runway for the gear, intermediate supporting rollers journalled on said frame for supporting the upper course of said belt, tubular sleeves interposed between said rollers and the belt and adjustable axially of said rollers, and means for locking said sleeves in adjusted axial position on the corresponding rollers.

3. In aircraft landing gear testing apparatus, the combination of a frame, spaced journals on said frame, parallel end rollers in said journals, power means for driving one of said rollers, a pair of endless belts encircling said rollers and driven thereby to jointly constitute a driven runway for the gear, intermediate supporting rollers journalled on said frame for supporting the upper course of said belt, a pair of sleeves mounted on each roller and interposed between the same and the corresponding belts, means for adjusting at least one of said sleeves axially of each corresponding roller to laterally shift the corresponding belt and thereby vary the overall width of the runway, and means for locking said sleeves in adjusted axial position on the corresponding rollers.

4. In aircraft landing gear testing apparatus, the combination of a frame, spaced journals on said frame, parallel end rollers in said journals, power means for driving one of said rollers, a pair of endless belts encircling said rollers and driven thereby to jointly constitute a driven runway for the gear, intermediate supporting rollers journalled on said frame for supporting the upper course of said belt, a pair of circumferentially grooved sleeves mounted on each roller and interposed between the same and the corresponding belts, means for adjusting said sleeves axially of each corresponding roller toward and away from each other to laterally shift the corresponding belt and thereby vary the overall width of the runway, and means for locking said sleeves in adjusted axial position on the corresponding rollers.

5. In aircraft landing gear testing apparatus, the combination of a frame, spaced journals on said frame, parallel end rollers in said journals, power means for driving one of said rollers, an endless belt encircling said rollers and driven thereby to constitute a driven runway for the gear, and intermediate supporting rollers journalled on said frame and extending progressively increasing distances and then progressively decreasing distances above a plane tangent to the end rollers for supporting and deflecting the upper course of said belt in a substantially convex contour.

6. In aircraft landing gear testing apparatus, the combination of a frame, spaced journals on said frame, parallel end rollers in said journals, power means for driving one of said rollers, an endless belt encircling said rollers and driven thereby to constitute a driven runway for the gear, intermediate supporting rollers journalled on said frame and extending above a plane tangent to the end rollers for supporting and deflecting the upper course of said belt in a substantially convex contour, and at least one center roller lying between and above said intermediate rollers to impart a convex contour to said belt, said end rollers being essentially solid and formed of heavy metal to act as flywheels for overcoming the braking action of the landing gear.

References Cited in the file of this patent

UNITED STATES PATENTS

| Number | Name | Date |
|---|---|---|
| 1,663,344 | Lennard | Mar. 20, 1928 |
| 1,746,718 | Smith | Feb. 11, 1930 |
| 1,894,935 | Bigelow | Jan. 17, 1933 |
| 2,067,400 | Koplin | Jan. 12, 1937 |
| 2,155,218 | Cain | Apr. 18, 1939 |

FOREIGN PATENTS

| Number | Country | Date |
|---|---|---|
| 541,728 | Great Britain | Dec. 9, 1941 |